June 25, 1968   J. F. ABERE ET AL   3,389,827

EASY-OPEN CONTAINER AND SEALING TAPE

Filed April 10, 1967

INVENTORS
WILFRED R. BROCHMAN
JOSEPH F. ABERE
BY Carpenter, Kinney & Coulter
ATTORNEYS United States Patent Office 3,389,827
Patented June 25, 1968

3,389,827
EASY-OPEN CONTAINER AND SEALING TAPE
Joseph F. Abere, White Bear Lake, and Wilfred R. Brochman, Oakdale Township, Washington County, Minn., assignors to Minnesota Mining and Manufacturing Company, St. Paul, Minn., a corporation of Delaware
Filed Apr. 10, 1967, Ser. No. 629,515
11 Claims. (Cl. 220—53)

ABSTRACT OF THE DISCLOSURE

Easy-open containers having a dispensing opening sealed with pressure-sensitive tape or tape having short term characteristics of pressure-sensitive tape, and tapes therefore having adhesive coatings including cross-linked neoprenes, acrylates, and tackified block copolymers.

---

Figure 1:
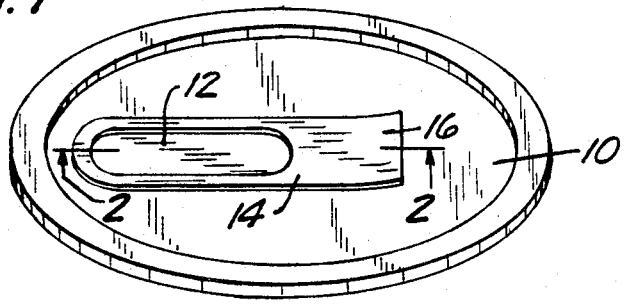

This invention relates to improved container closures and adhesive tapes for forming such closures.

In recent years much emphasis has been placed on the development of containers which are safely hermetically sealed, but which can be easily opened by the consumer. One method which has been suggested is the sealing of an aperture in a container wall, for example a metal can, by means of a heat sealable strip or tape of sealing material. Various embodiments of this general concept are disclosed in U.S. Patent 2,870,935 (Houghtelling) issued Jan. 27, 1959; U.S. Patent 3,186,581 (Schneider et al.) issued June 1, 1965; U.S. Patent 3,251,515 (Henchert et al.) issued May 17, 1966; or U.S. Patent 3,292,828 (Stuart) issued Dec. 20, 1966. Such containers have thus far met with only limited success in the marketplace. A major problem encountered in the development of such closures is the difficulty of obtaining materials which have sufficient physical properties to be formed into such a seal under the conditions encountered in the filling and closing of metal containers. Even where closures have been successfully formed by optimum selection of materials for forming the sealing strip, the performance of the closures has been found to vary greatly. Such variability is apparently introduced by the fact that, where thermoplastic materials are used, the properties of the sealing strip, especially the peel force required to remove the closure and the ability of the seal to withstand pressures from within or without the can, vary greatly in accordance with such difficult-to-control factors as the temperature, pressure, and dwell time of application of the seal to the container end. The temperature and time required to bond such sealing tape to container ends may vary considerably from batch to batch, often depending on minor fluctuations in the conditions under which the adhesive was applied to the backing in forming the sealing strip.

Pressure-sensitive adhesives have many desirable properties which would make them advantageous for use in container sealing applications. Such adhesives can be applied at room temperature with only moderate pressures, even finger tip pressure, and can be peeled away smoothly because of the "legging out" of the adhesive as the tape is peeled from a substrate, thus evening out the peel forces. Considerable efforts have been expended on finding a pressure-sensitive adhesive tape which would provide these properties and yet be able to withstand the rigors of packaging of materials in metal containers. For example, in hot fill procedures the contents are poured into a can at temperatures of about 180° to 212° F. The can end is then secured, generally by a double seam, to the can, which is then cooled to room temperature. A positive pressure of up to 1½ atmospheres may be exerted from within the can, which slowly decreases as cooling takes place until a vacuum is finally created. In autoclave steam process canning procedures the internal can pressures may approach 3 atmospheres. Insofar as we are aware, pressure-sensitive adhesive tapes capable of withstanding such conditions have not existed prior to the present invention.

The above noted Stuart patent at column 3 suggests that "creep-resistant pressure-sensitive adhesives" may be used. However, when the best creep-resistant compositions known to the prior art are used, failure of the adhesive occurs at temperatures as low as 140° F. For example, when adhesives such as shown in U.S. Patent 3,284,423 (Knapp) issued Nov. 8, 1966, are used, the tape fails adhesively at shear stresses below 8 p.s.i. within an unsatisfactorily short time. Thus the use of pressure-sensitive adhesive tapes has been limited to the packaging of dry goods, for example, salt.

The term "pressure-sensitive" as used herein is known in the art to be an adhesive which in dry (solvent-free) form is aggressively and permanently tacky at room temperature and firmly adheres to a variety of dissimilar surfaces upon mere contact without the need for more than finger or hand pressure. These adhesives require no activation by water, solvent, or heat, in order to exert a strong adhesive-holding force toward such materials as paper, cellophane, glass, wood and metals. They have a sufficiently cohesive and elastic nature so that, despite their aggressive tackiness, they can be handled with the fingers and removed from smooth surfaces without leaving a residue. See "Adhesion and Adhesives," vol. II, second ed., Houwink and Salomon, the Elsevier Publishing Company, 1967 (p. 387).

The invention for the first time provides container closures which utilize tapes coated with pressure-sensitive adhesives for sealing an aperture in a container. The invention also contemplates the use of tapes which have the properties of pressure-sensitive adhesives for a short time. The latter tapes have all of the properties of pressure-sensitive adhesive tape for a period of days or weeks after manufacture, but fall outside of the definition of pressure-sensitive adhesives because of a reduction in tack after a relatively brief aging period. The tapes of this invention can be adhered at room temperature with only slight pressure to clean metal or varnished metal used for forming containers. The only heating of the tapes which occurs in any event is that caused by pouring the hot contents into the container. The tapes so applied are capable of withstanding pressures normally generated in the container, for example, a can containing a beverage, and yet may be readily peeled by hand from the container to open the aperture for dispensing of the contents of the container. The aperture may be, for example, a hole or a plurality of holes in the top of a metal can, or may be a slit extending nearly circumferentially around a container so that the top may be removed, for example, in the case of a coffee can.

Figure 2:
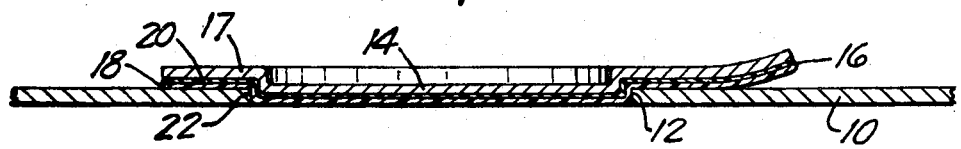
Figure 3:
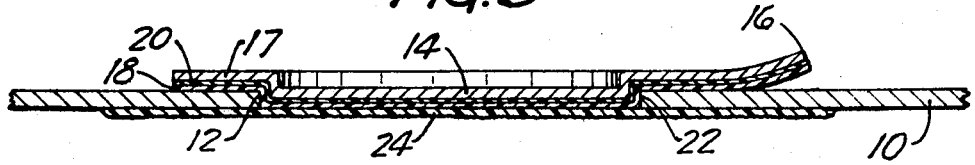

The invention will be further explained with reference to the accompanying drawing, wherein:

FIGURE 1 is a perspective view of one type of container closure formed in accordance with the invention, FIGURE 2 is a cross-sectional view along line 2—2 of FIGURE 1, and FIGURE 3 is a cross-sectional view of a similar closure showing a further embodiment of the invention.

Referring more particularly to FIGURE 1, there is seen a container lid blank 10 having a pre-formed opening 12 therein which opening is sealed by means of an adhesive strip 14. One end 16 of the adhesive strip is not sealed to the blank 10 and serves as a pull tab for removing the strip.

As seen in FIGURES 2 and 3, ahesive strip 14 comprises a backing 17 which is adhered to the portions of the lid 10 surrounding opening 12 by means of an adhesive 18, which may be a pressure-sensitive adhesive. As will hereinafter be more particularly explained, there is a thin layer of primer 20 between the backing 17 and the adhesive 18. In the embodiment of FIGURE 2 a raw metal edge 22 surrounding the opening, formed in the lid stamping operation, is exposed to the contents of the container and therefore this embodiment is used only in cases in which the contents will not undergo unwanted reaction with the bare metal and will not weaken or react with adhesive 18. Examples of such contents are oils, anti-freeze, and fruit or vegetable juices.

In the embodiment of FIGURE 3 a coating 24 preferably of a polymeric material is applied to the underside of the opening to cover the adhesive 18 exposed through the opening, the bare metal edge 22, and a portion of the lid blank 10 surrounding opening 12. Such a coating may be applied by techniques such as spraying or adhesively applying a polymer layer, etc.

There are a number of important requirements for the adhesive strip. It should have a strong, flexible, non-stretchy backing member that is preferably of soft metal, such as dead-soft aluminum, but may be a tough plastic, such as polyethylene terephthalate, which has been oriented by stretching two and one-half times or more in at least the lengthwise direction. Such plastics are preferably vapor coated with a thin layer of metal to produce opacity and improve the impermeability of the backing. Other backing materials will be apparent to those skilled in the art.

The backing member should be 1 to 10 mils in thickness and should be capable of being pulled back upon itself without rupture. For convenience of removal of the adhesive strip, it should neither break nor elongate more than 25% under a tension of 4 pounds. To provide a closure which will withstand the forces exerted on it with an adequate margin of safety, the backing material at a width of one inch should have a strength at break of at least 15 pounds.

When the adhesive strip is adhered to clean tin plate by its own adhesive, it should provide a peel resistance (at ordinary hand removal speeds) within the range of 1 to 10 pounds per inch width, preferably within about 2 to 6 pounds, at any temperature at which the can might be opened and at least between 40° F. and 100° F. When the adhesive strip of this invention is applied to other metals commonly used in making cans or is applied over coatings or finishing varnishes, the peelback resistance continues to be very uniform at all ambient temperatures and remains remarkably close to values obtained on tin plate, generally well within 1 to 10 pounds.

The adhesives useful in practicing the invention have an extraordinary combination of properties and are characterized by high internal strength coupled with high elongation. Tapes which are useful in the practice of this invention are coated with an adhesive which will withstand a dead shear load of 8.8 p.s.i. at 140° F. for at least 1000 minutes. This shear strength is tested as follows:

Test strips of the tape ½" x 6" are applied to a panel of varnished tin plate (of the type commonly used for metal cans) with ordinary finger pressure. The composite is cut ½" from the edge of the panel so that a contact area of ½" x ½" is formed. A hook is attached to the free end of the tape and the panel is mounted vertically in a circulating air oven at 140° F. for two minutes to reach equilibrium temperature. A 1,000 g. weight is attached to the free end in such a manner as to exert its full weight in a shear force in the same plane as the ½" x ½" contact area. The 1,000 gram weight on a ¼ sq. in. sample exerts a force of 8.8 p.s.i. Tapes useful in the practice of the invention will withstand this shear stress for at least 1000 minutes without failure. The preferred tapes of this invention can withstand 15 p.s.i. when tested in this manner for indefinite periods of time, exceeding at least 25,000 minutes.

The side of the backing 17 beneath the adhesive coating 18 must generally be treated to improve the anchorage of the adhesive and thereby insure that no adhesive transfers to the can when the adhesive strip is peeled off. For example, the metal backing 17 may be etched to promote adhesion. Primer 20, preferably used to improve anchorage of adhesive 18 to backing 17 is generally applied in very small amounts and generally comprises a mixture of materials, at least one of which has a strong affinity for the backing and one of which has a strong affinity for the adhesive. Specific examples of such primers are given in the accompanying examples. Other suitable primers will be apparent to those skilled in the art. The adhesive must be bonded to the backing so securely that transfer of adhesive from the backing does not occur over the range of temperatures normally encountered with containers, which may range from below 0° F. in the case of frozen foods, to over 120° F. in cases where the container has been exposed to extremely hot conditions in transit or storage.

In cases where a coating 24 is applied over the bottom of the closure as in the embodiment of FIGURE 3, the coating is preferably applied by brushing or spraying a solution of polymer onto the lids after application of the adhesive strip. The coating is hardened by drying off of the solvent. Examples of suitable polymeric materials for forming coatings are soluble epoxy resins, polyester or polyether polyurethanes, ethylene-vinyl acetate copolymers, and phenoxy resins.

The high internal strength adhesives required in this invention can be based on several elastomeric materials as the main rubbery component. For example, high internal strength elastomers based on cross-linked high molecular weight polymers of the acrylate type, stereo associated polymers such as the polychloroprenes, and certain block copolymers, have been found to provide the exceptionally high shear strength required in the adhesive systems. Polymers which exhibit intermolecular association such that they have high internal strength even after compounding with resins are useful. Among such polymers are the synthetic polychloroprenes and trans-polyisoprenes. Unlike so-called thermoplastic materials which become molten and flow easily when heated above their softening range, these polymers remain in a tacky solid state and thus can be used at elevated temperatures.

Among the preferred polymers for preparing adhesives for use in practicing the invention are block copolymers having 3 or more polymer block structures having a general configuration $$-A-B-A-$$

wherein each A is a thermoplastic polymer block with a glass transition temperature above room temperature (i.e. above about 20° C.) having an average molecular weight between about 5,000 and 125,000, and B is a polymer block of a conjugated diene having an average molecular weight between about 15,000 and 250,000.

In order to form adhesives suitable for can sealing applications, it is essential that the composition be essentially free of plasticizers such as the oil required by Harlan, Jr. to formulate a pressure-sensitive adhesive. Adhesives containing oils and the like suffer from being thermoplastic in nature and not only soften at moderately elevated temperatures, but also often suffer a permanent degradation in strength.

The choice of species and molecular weights of each of the individual blocks of these block copolymers is based upon properties obtained by utilizing block copolymers having the limitations now to be described. While the specific molecular weight of the elastomeric blocks prepared from the conjugated diene and the plastic blocks may be varied for specific end uses, it is preferred that the elastomeric blocks have an average molecular weight from about 15,000 to about 250,000, and that the plastic blocks prepared from vinyl arene comprise 20-80% by weight of the entire block copolymer, the individual molecular weights of these plastic blocks being coordinated for this purpose with the average molecular weight of the elastomeric blocks.

The non-elastomeric or plastic blocks are those having average molecular weights between about 5,000 and 125,000. These blocks are prepared by polymerization of vinyl monomers and/or acrylic monomers and should have glass transition temperatures above about 20° C., the difference in glass transition temperature between that of elastomeric blocks and of the plastic blocks being greater than about 100° C. If the glass transition temperature of the elastomeric blocks and plastic blocks respectively are in an area substantially less than this limit, the desirable reinforcing properties are not provided.

The non-elastomeric blocks may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include particularly those of the benzene series such as styrene, vinyl toluene, vinyl xylene, ethyl vinyl benzene, as well as dicyclic monovinyl compounds such as vinyl naphthalene and the like. Other non-elastomeric polymer blocks may be derived from alpha olefine, alkylene oxides, acetals, urethanes, etc.

The elastomeric blocks are prepared from conjugated dienes such as isoprene, butadiene, copolymers of styrene and butadiene, as well as their homologues. The method for preparation of these block copolymers is shown in the above noted U.S. Patent No. 3,239,478 (Harlan, Jr.) issued Mar. 8, 1966.

Examples of suitable tackifying resins for the elastomers described herein include: rosin, polyterpene resins, coumarone-indene resins, phenol-aldehyde resins, chlorinated biphenyls, hydrogenated rosin, and pentaerythritol or glycerol esters thereof.

The tackifying resin used must have a degree of compatibility with the elastomer such that it imparts enough wet tack to the surface of the dried adhesive film to allow positioning of the tape on the metal surface with slight pressure at room temperatures. Normal resin loadings range from 10–200 parts based on 100 parts of the rubber component. The resin or combinations of resins used must not adversely affect the high shear holding capability of the resultant adhesive at elevated temperatures up to at least 140° F.

Other suitable adhesives include normally tacky acrylic copolymers of the type generally disclosed in U.S. Patent 2,925,174 (Stow) issued Feb. 16, 1960. These copolymers, in order to be useful in the practice of the invention must be cross-linked to the extent that the required shear strength at 140° F. is provided without loss of tackiness. The crosslinking of the adhesive is essential to provide the required high shear strength. However the amount of cross-linking must be substantially less than that disclosed in the Stow patent in order to avoid adhesive failure of the bond. The amount of crosslinker is extremely small, but critical, and should be between 0.01 to 0.5 percent by weight of the acrylic copolymer.

As noted previously, the invention also contemplates the use of adhesives which fall outside of the definition of pressure-sensitive adhesives. Such formulations are based on high cohesive strength polymers such as polychloroprene (including neoprene), which, when tackified, form adhesives which behave like pressure-sensitive adhesives for a period of days or weeks. Even when freshly prepared and applied to a backing, these adhesives lack the "wet-grab," "quick-tack," or "thumb appeal," normally associated with pressure-sensitive adhesives. However, the adhesives are readily applied to clean metal or varnished metal surfaces with only finger pressure and form sufficiently strong bonds to be used in practicing the invention. After a period of time, generally about two weeks, the adhesives can no longer be applied at room temperature to form strong bonds. In using such tapes, it is generally necessary for the can manufacturer to preheat the adhesive prior to application, or to apply the tape to can lids preheated, for example, to 120° F. to 150° F. All of the tapes of this invention are capable of forming strong bonds when applied to clean or varnished metal at finger-tip pressure at temperatures below 150° F.

The invention will be further illustrated by the following examples in which all parts are given by weight unless otherwise indicated.

*Example I*

An adhesive was prepared as follows: 525 grams of commercial grade heptane was weighed into a container and agitated, while 75 grams of pulverized polyterpene resin (Hercules S–1010) and 100 grams of a block copolymer of styrene and butadiene having 1 polymer block of 70,000 molecular weight butadiene and 2 polymer blocks 15,000 molecular weight styrene (Shell Kraton 101) were added. Mixing was continued for ten hours until a total solution formed.

A primer was made in a similar fashion using 550 grams of commercial grade toluene and 733 grams of commercial grade methyl isobutyl ketone, 50 grams of poly (B-pinene) resin (Piccolyte S–115), and 100 grams of a terpolymer of butadiene/styrene/acrylonitrile.

A tape was formed by coating approximately 1 mil of the primer solution on 3 mil polyethylene terephthalate film which has been previously aluminum vapor coated on the reverse side, thus giving it a metal-like appearance, drying thoroughly, and applying a uniform coating of the adhesive solution on top of the primer so as to leave about 6 grains of adhesive per 24 sq. inch after drying. A tape for the innerside of a lid was prepared in the same manner, using 0.5 mil polyvinylidene chloride film. This film was also primed and coated with the above pressure-sensitive adhesive. The top tab was positioned over an aperture in a can lid and the bottom film was placed on the opposite side, application being made with a hand roller. The lid was end-seamed onto a can body, which was inverted and filled with hot tomato juice at 205° F. The bottom was then end-seamed onto the can. The container remained hermetically sealed for a period of at least one year at room temperature, and could be easily opened by peeling away the tab. The portion of the inner tab coincident with the aperture was torn out upon removal of the top tab.

*Example II*

An improvement in the water resistant features of the tape described in Example I was desired because of the direct contact of the can contents with the adhesive in the unitary structure. Therefore, new formulations were made for the adhesive and primer.

| Adhesive: | G. |
|---|---|
| Kraton 101 (see Example I) | 100 |
| Resin S–1010 (see Example I) | 80 |
| Finely divided silica (Cab-O-Sil M–5) | 2.2 |
| Toluene | 273.3 |
| Primer: | |
| Polychloroprene polymer (amorphous type) | 100 |
| Phenol-formaldehyde resin solid, "B" stage | 70 |
| Antioxidant | 2 |
| Magnesium oxide | 4 |
| Zinc oxide | 5 |
| Methyl ethyl ketone | 90.5 |
| Toluene | 633.5 |

Coating solutions were prepared as described in Example I, and tape was made using the 3 mil aluminum vapor coated polyethylene terephthalate film as before. The tape was applied over an aperture in a can lid as in Example I, and the lid was crimped over a can body, which was then hot-filled and sealed.

Typically, the tape is first subjected to a super atmospheric pressure which produces bulging, and then when cooling occurs gradually a vacuum develops. In both cases, the tape described very efficiently holds the contents as a true hermetic seal. Not only does this system work during the processing stage, but also holds the desired characteristics of an easily-opened hermetically-sealed container over many months.

*Example III*

A mixture of 10 parts by weight of ethyl acetate, 90 parts by weight of isooctyl acrylate, 10 parts of acrylic acid, and 0.37 part of benzoyl peroxide, was purged well with nitrogen and brought to 55° C. with agitation. Polymerization started after about one hour, and the batch gradually thickened. An additional 0.25 part of benzoyl peroxide was added at 3–4 hours, and a like quantity at 7–8 hours. Heating was continued for a further 6 hours. The polymer produced had an inherent viscosity of at least 1.5 as measured by a dilute solution in ethyl acetate using a size 50 Cannon-Fenske viscosimeter.

The polymer solution was then diluted with heptane to a total solids content of 20–25% non-volatiles. Immediately prior to coating the solution, 0.075 part by weight of solids of a polyalkyleneimine cross-linking agent was added. The adhesive solution so prepared was then coated on 3 mil polyethylene terephthalate, as described above in Example I. Tabs cut from the coated sheet were applied over an aperture in a can lid as in Example I, and the lid was crimped over a can body filled with boiling water.

When tested for shear strength at 140° F. as described above, the tape withstood a load of 8.8 p.s.i. for more than 1,000 minutes.

*Example IV*

An adhesive was prepared as follows: 300 grams of crystalline polychloroprene (Du Pont neoprene Ac) was banded onto a cold 2-roll rubber mill and 15 grams each of magnesium oxide and zinc oxide powders were dispersed in the banded rubber, 5 minutes mill time. The resultant sheet of milled rubber was removed from the mill, cut into small pieces, and placed in 770 grams of an equal mixture of commercial grades methyl ethyl ketone and toluene. After mixing overnight, a 30% total solids solution resulted.

30 g. of a 30% solution of phenol formaldehyde resin (Schnectady SP–559) in commercial grade toluene and 7 grams of a 30% solution of polychlorinated polyphenyl (Aroclor 1260, white viscous liquid) in toluene were added to 70 g. of the rubber solution and mixed thoroughly.

The solution was coated to a thickness (dry basis) of 9 grains of adhesive for 24 sq. inches on 3 mil thick polyethylene terephthalate metal coated on the reverse side as in Example I. Previous to coating of the adhesive the backing was primed with the primer of Example II. The adhesive was dried at 140° F. for 10 minutes and cured at 300° F. for 15 minutes to cross-link the adhesive.

When tested for shear strength at 140° F. in accordance with the above defined test, using a 2000 gram weight to apply a shear stress of 15 p.s.i., the tape withstood in excess of 1000 minutes without failure. The tape, although not aggressively tacky at room temperature, could be applied to metal preheated to about 150° F. to form a strong shear resistant bond.

What is claimed is:
1. In a hermetically sealed container containing pourable material having a rigid wall with a preformed aperture therein, the improvement comprising:
   a sheet material adhered by its own adhesive directly to said wall over and surrounding said opening and releasably hermetically sealing said opening, which sheet material is readily peelable by hand from said wall without transfer of adhesive to said wall to provide easy and convenient opening of said preformed opening, said sheet material comprising a flexible non-stretchy backing member about 1 to 10 mils in thickness which neither breaks nor elongates more than 25% under a tension of 4 pounds and is capable of being pulled back upon itself without rupture, said backing member carrying a smooth, uniform coating of adhesive based on a high strength rubbery polymer, said adhesive having been capable of application to said wall at temperatures below 150° F. with finger-tip pressure to form a hermetic seal capable of withstanding a pressure differential of at at least 7.5 p.s.i.g. from both within and without said container, said adhesive coating affording resistance to dead load shear of at least 8.8 p.s.i. at 140° F. as herein defined for at least 1000 minutes, said sheet material having a peel resistance within the range of 1 to 10 pounds per inch width at ambient temperatures from at least 40° to 100° F.

2. A hermetically sealed container according to claim 1 wherein said rubber polymer is a block copolymer having the general configuration A—B—A, wherein each A is a thermoplastic polymer block with a glass transition temperature above room temperature having an average molecular weight between about 5,000 and 125,000, and B is a polymer block of a conjugated diene having an average molecular weight between about 15,000 and 250,000.

3. A container according to claim 2 wherein the block polymer has the configuration
polystyrene-polybutadiene-polystyrene.

4. A container according to claim 1 wherein said adhesive is a viscoelastic acrylate polymer.

5. A container according to claim 1 wherein said adhesive is based on a tackified cross-linked polychloroprene rubber.

6. A container according to claim 1 wherein said container wall is an end of a metal can.

7. An adhesive tape capable of hermetically sealing containers containing pourable material in which a rigid wall having a preformed aperture therein is sealed with said tape comprising a flexible non-stretchy backing about 1 to 10 mils in thickness which neither breaks nor elongates more than 25% under a tension of 4 pounds and is capable of being pulled back upon itself without rupture, said backing member carrying on one side thereof a smooth, uniform coating of adhesive, said adhesive being capable of application to said wall at a temperature below 150° F. with finger-tip pressure to form a hermetic seal capable of withstanding a pressure differential of at least 7.5 p.s.i.g. from both within and without said container, said adhesive being bonded to said backing by means of a thin layer of a primer formed from a mixture of materials having an affinity for said backing together with materials having an affinity for said adhesive, said adhesive coating when applied to a metal substrate at finger pressure affording resistance to dead load shear of at least 8.8 p.s.i. at 140° F. (as herein defined) for at least 1,000 minutes, said tape having a peel resistance from metal and varnished metal within the range of 1 to 10 pounds per inch width at ambient temperatures from at least 40° to 100° F., said tape being readily peelable by hand from said wall without transfer of adhesive to said wall to provide easy and convenient opening of said container.

8. A tape according to claim 7 wherein said rubber polymer is a block copolymer having the general configuration A—B—A, wherein each A is a thermoplastic polymer block with a glass transition temperature above room temperature having an average molecular weight between about 5,000 and 125,000, and B is a polymer block of a conjugated diene having an average molecular weight between about 15,000 and 250,000.

9. A tape according to claim 7 wherein the block copolymer has the configuration
polystyrene-polybutadiene-polystyrene.

10. A tape according to claim 7 wherein said adhesive is a viscoelastic acrylate polymer.

11. A tape according to claim 7 wherein said adhesive is based on a tackified cross-linked polychloroprene rubber.

References Cited

UNITED STATES PATENTS

| | | | |
|---|---|---|---|
| 2,870,935 | 1/1959 | Hough Telling | 220—53 |
| 3,251,515 | 5/1966 | Henchert et al. | 222—487 |
| 3,292,828 | 12/1966 | Stuart | 220—53 |
| 3,312,368 | 4/1967 | Reynolds et al. | 220—53 |
| 3,339,788 | 9/1967 | Lipske | 220—53 |
| 3,355,059 | 11/1967 | Balocca et al. | 220—53 |

THERON E. CONDON, *Primary Examiner.*

G. T. HALL, *Assistant Examiner.*

UNITED STATES PATENT OFFICE
CERTIFICATE OF CORRECTION

Patent No. 3,389,827                      June 25, 1968

Joseph F. Abere et al.

It is certified that error appears in the above identified patent and that said Letters Patent are hereby corrected as shown below:

Column 1, line 15, "therefore" should read -- therefor --. Column 5, line 26, "olefine" should read -- olefins --. Column 7, line 10, "10 parts by weight" should read -- 150 parts by weight --; line 69, "a" should read -- A --.

Signed and sealed this 2nd day of December 1969.

(SEAL)
Attest:

Edward M. Fletcher, Jr.                      WILLIAM E. SCHUYLER, JR.

Attesting Officer                            Commissioner of Patents